(12) United States Patent
Gallant et al.

(10) Patent No.: US 9,637,234 B2
(45) Date of Patent: May 2, 2017

(54) AIRPLANE WITH A FUSELAGE HAVING SIDE OUTGROWTH DELIMITING STORAGE SPACES

(71) Applicant: Airbus Operations (SAS), Toulouse (FR)

(72) Inventors: Guillaume Gallant, Lareole (FR); Romain Delahaye, Colomiers (FR)

(73) Assignee: AIRBUS OPEATIONS (SAS), Toulouse (FR)

( * ) Notice: Subject to any disclaimer, the term of this patent is extended or adjusted under 35 U.S.C. 154(b) by 256 days.

(21) Appl. No.: 14/139,153

(22) Filed: Dec. 23, 2013

(65) Prior Publication Data
US 2014/0175218 A1    Jun. 26, 2014

(30) Foreign Application Priority Data
Dec. 26, 2012   (FR) ..................................... 12 62803

(51) Int. Cl.
| | |
|---|---|
| *B64D 9/00* | (2006.01) |
| *B64D 37/04* | (2006.01) |
| *B64C 1/22* | (2006.01) |
| *B64C 1/14* | (2006.01) |
| *B64C 1/26* | (2006.01) |
| *B64C 1/00* | (2006.01) |

(52) U.S. Cl.
CPC ................. *B64D 9/00* (2013.01); *B64C 1/00* (2013.01); *B64C 1/1484* (2013.01); *B64C 1/26* (2013.01); *B64D 37/04* (2013.01); *B64C 2001/0045* (2013.01)

(58) Field of Classification Search
CPC .. B64C 1/22; B64C 2001/0045; B64D 11/003

USPC .................... 244/117 R, 118.1, 119
See application file for complete search history.

(56) References Cited

U.S. PATENT DOCUMENTS

| | | | | |
|---|---|---|---|---|
| 2,967,034 A | * | 1/1961 | Eyre ............................. 244/119 |
| 3,405,893 A | * | 10/1968 | Rajau et al. ................... 244/119 |
| 4,294,419 A | * | 10/1981 | Fouse et al. ................ 244/117 R |
| 4,674,712 A | * | 6/1987 | Whitener et al. ............. 244/119 |
| 5,115,999 A | * | 5/1992 | Buchsel ..................... B64C 1/00 |
| | | | | 244/118.5 |
| 5,542,626 A | * | 8/1996 | Beuck ..................... B64C 1/062 |
| | | | | 244/105 |
| 5,893,535 A | | 4/1999 | Hawley | |
| 6,047,923 A | * | 4/2000 | Lafferty ......................... 244/15 |

(Continued)

FOREIGN PATENT DOCUMENTS

| | | |
|---|---|---|
| DE | 102005060369 | 7/2007 |
| FR | 2879560 | 6/2006 |

OTHER PUBLICATIONS

French Search Report, Aug. 23, 2013.

*Primary Examiner* — Christopher P Ellis
*Assistant Examiner* — Michael Wang
(74) *Attorney, Agent, or Firm* — Greer, Burns & Crain, Ltd.

(57) ABSTRACT

An aircraft of which the transversal section of the fuselage is reduced optimally at the price of a reduced carrying capacity of luggage or merchandise but adapted to short- and medium-haul type routes. The fuselage has for this purpose lateral protuberances defining storage areas arranged on either side of a passenger cabin and able to house luggage and/or merchandise, and/or onboard service equipment, and/ or removable fuel tanks.

20 Claims, 4 Drawing Sheets

(56) References Cited

U.S. PATENT DOCUMENTS

| | | | |
|---|---|---|---|
| 6,199,795 B1 | 3/2001 | Williams | |
| 6,394,392 B1 * | 5/2002 | Lafferty | 244/118.1 |
| 6,848,650 B2 * | 2/2005 | Hoisignton | B60V 1/08 |
| | | | 180/116 |
| 7,395,989 B2 * | 7/2008 | Saint-Jalmes et al. | 244/118.1 |
| 8,336,811 B2 * | 12/2012 | Cazals | B64C 1/26 |
| | | | 244/2 |
| 8,608,108 B2 * | 12/2013 | Boren | B64D 11/00 |
| | | | 244/118.5 |
| 8,899,520 B2 * | 12/2014 | Barmichev et al. | 244/119 |
| 2006/0065784 A1 * | 3/2006 | Rouyre | B64D 29/06 |
| | | | 244/119 |
| 2006/0214057 A1 | 9/2006 | Saint-Jalmes et al. | |
| 2008/0099610 A1 * | 5/2008 | Jimenez Del Lago | B64C 1/26 |
| | | | 244/119 |
| 2009/0072077 A1 * | 3/2009 | Chiu | 244/15 |
| 2009/0078830 A1 * | 3/2009 | Fol | B64C 7/02 |
| | | | 244/200 |
| 2010/0012782 A1 * | 1/2010 | Hoffjann et al. | 244/120 |
| 2010/0163670 A1 | 7/2010 | Dizdarevic et al. | |
| 2011/0121133 A1 * | 5/2011 | Mueller | B64C 1/066 |
| | | | 244/118.1 |
| 2014/0183301 A1 * | 7/2014 | Mora Ordonez | 244/118.1 |

* cited by examiner

AIRPLANE WITH A FUSELAGE HAVING SIDE OUTGROWTH DELIMITING STORAGE SPACES

CROSS-REFERENCES TO RELATED APPLICATIONS

This application claims the benefit of the French patent application No. 1262803 filed on Dec. 26, 2012, the entire disclosures of which are incorporated herein by way of reference.

BACKGROUND OF THE INVENTION

This invention relates to the field of commercial passenger transport aircraft, and in particular relates to an aircraft provided with a new fuselage architecture.

Commercial transport aircraft usually comprise a substantially circular section fuselage divided into an upper portion reserved for passengers and into a lower portion reserved for luggage and/or merchandise as well as for certain onboard service equipment such as electronics bays. The lower portion is sometimes also used to house a fuel tank.

However, the volume available in the lower portion is sometimes under-utilized, in particular with regards to aircraft flying short- and medium-haul routes, for which passengers generally carry a reduced baggage volume.

In this case, the mass and the aerodynamic performance of these aircraft is penalized needlessly, in such a way that the cost price per passenger is not optimal.

Moreover, the wings of such an aircraft are in general connected to the fuselage by means of a wing central spar box arranged within the fuselage, in a non-pressurized zone. Such a central spar box as such induces an irregularity in the shape of the pressurized region of the fuselage. This pressurized region generally comprises the cockpit, the passenger cabin and the cargo hold or holds.

Similarly, the rear landing gears are in general housed in gear compartments each forming a non-pressurized cavity within the fuselage, and therefore also inducing an irregularity in the shape of the pressurized region of the fuselage.

Such irregularities in shape of the pressurized region of the fuselage reduce the natural resistance of the structure of the fuselage to pressurization loads. In order to offset this reduction in the resistance to pressurization forces, aircraft designers are led to increase the mass of the structure of the fuselage, which is penalizing for the performances of the aircraft.

SUMMARY OF THE INVENTION

The invention has in particular for purpose to provide a simple, economical and effective solution to at least a portion of these disadvantages.

It has in particular for object an aircraft of which the ratio of volumes reserved respectively for passengers and for luggage is optimized for short- and medium-haul routes.

The invention proposes for this purpose a commercial passenger transport aircraft, comprising a fuselage comprising a front part and a rear part, as well as an intermediate portion connecting the front part to the rear part and wherein is housed a passenger cabin provided with a plurality of passenger seats.

According to the invention, said intermediate portion of the fuselage comprises a first longitudinal portion, having:

a median portion centered in relation to a median vertical plane of the aircraft and wherein is housed at least one portion of said passenger cabin, and at least two lateral protuberances arranged on either side of said median portion, preferably in a symmetrical way in relation to said median vertical plane.

Said lateral protuberances are separated from said passenger cabin respectively by means of two longitudinal partitions laterally delimiting said passenger cabin.

In addition, said lateral protuberances respectively define at least two storage areas on either side of said median vertical plane, which are preferably mutually symmetrical in relation to said median vertical plane.

Moreover, each of said lateral protuberances has an upper end and a lower end which connect to said median portion of said first longitudinal portion of the fuselage, and the connection of said upper end and lower end of each of said lateral protuberances forms a discontinuity of the curvature of an external surface of the fuselage as viewed in transverse section.

The invention as such proposes a new aircraft architecture provided with storage areas arranged laterally in relation to the passenger cabin, within lateral protuberances of the fuselage.

The aircraft according to the invention can as such be entirely devoid of a cargo hold in the lower portion of the fuselage, i.e., under the floor of the passenger cabin.

The aircraft thus may be of the simple deck type.

The invention allows for an optimum use of the interior volume of the fuselage of the aircraft, and as such makes it possible to reduce this interior volume, and in particular reduce the transversal section of the fuselage according to the vertical direction.

This results in an optimization of the mass and of the aerodynamic properties of the aircraft.

The arrangement of storage areas on the sides of the passenger cabin further allows for a reduction of noise perceived by the passengers and caused by the operation of aircraft engines.

In addition, this new fuselage architecture offers facilities in terms of manufacturing the aircraft. Indeed, for the same model of aircraft, it is possible to design several sections of fuselage intended to form the first longitudinal portion of the intermediate portion of the fuselage, and provided to be interchangeable at the moment when the aircraft is manufactured, with these sections being provided with lateral protuberances of different dimensions, able to be connected to the rest of the fuselage. It is as such possible to adapt each copy of the aircraft to specific needs in terms of carrying capacity and of performance of the aircraft.

More preferably, each of said longitudinal partitions has upper and lower ends connected to said fuselage.

Moreover, said intermediate portion of the fuselage advantageously comprises a second longitudinal portion, wherein is housed a portion of said passenger cabin, and having a substantially constant transversal section along a longitudinal direction of the aircraft. At least one portion of said first longitudinal portion more preferably has a substantially constant transversal section along the longitudinal direction of the aircraft, wherein this latter transversal section extends laterally beyond said second longitudinal portion on each side of said median vertical plane.

More preferably, said median portion of said first longitudinal portion of the fuselage has in transversal section a shape that can be substantially superimposed on that of said second longitudinal portion.

Moreover, the aircraft more preferably comprises a passenger cabin floor which divides the intermediate portion of the fuselage into an upper portion corresponding to the passenger cabin and into a lower portion, and which extends to a height such that, when said intermediate portion is seen as a transversal section, a vertical extent of said lower portion, measured in said median vertical plane of the aircraft, is less than half of a vertical extent of said passenger cabin also measured in said median vertical plane.

More preferably, at least a portion of each of said storage areas is delimited at the bottom by a storage area floor extending in the extension of said passenger cabin floor.

More preferably, the aircraft comprises devices for storing luggage and/or merchandise integrated to at least one of said storage areas.

More preferably, the aircraft comprises at least one onboard service equipment housed in at least one of said storage areas.

More preferably, the aircraft comprises two fuel tanks respectively housed in said storage areas.

More preferably, the aircraft comprises two landing gear compartments housed respectively in said lateral protuberances.

The gear compartments as such do not disturb the regularity of the shape of the pressurized region of the fuselage. This results in a better mechanical resistance of the fuselage with regards to pressurization loads.

More preferably, each of said longitudinal partitions integrates vertical uprights each having an upper end connected jointly to the upper end of the corresponding lateral protuberance and to an upper lateral end of said median portion of said first longitudinal portion of the fuselage, and a lower end connected jointly to the lower end of the corresponding lateral protuberance and to a lower lateral end of said median portion of said first longitudinal portion of the fuselage.

More preferably, the aircraft further comprises two wings as well as two wing spar boxes connecting respectively each of said wings to said median portion of said first longitudinal portion of the fuselage and extending entirely laterally in relation to this median portion.

As such the aircraft is devoid of a central spar box passing through the median portion of said first longitudinal portion of the fuselage. It must therefore be understood that each of the two wing spar boxes is separated from a median vertical plane of the fuselage.

The wing spar boxes as such do not disturb the regularity in shape of the pressurized region of the fuselage.

More preferably, said first longitudinal portion of the fuselage is provided with a plurality of windows integrated to an upper wall of said median portion of said first longitudinal portion of the fuselage.

BRIEF DESCRIPTION OF THE DRAWINGS

The invention shall be better understood, and other details, advantages and characteristics of the latter shall appear when reading the following description provided as a non-restricted example and in reference to the annexed drawings wherein.

In all of these figures, identical references can designate identical or similar elements.

DETAILED DESCRIPTION OF THE PREFERRED EMBODIMENTS

The annexed figures describe an aircraft 10 according to a preferred embodiment of the invention. This aircraft is intended for the commercial transport of passengers, more particularly for short-haul routes.

In all of this description, X refers to the longitudinal direction of the aircraft 10 corresponding to its forward direction, Z refers to the vertical direction of the aircraft 10, corresponding to the direction of the height perceived by a passenger aboard the aircraft, and Y refers to the transversal direction orthogonal to the longitudinal X and vertical Z directions.

Figure 1:
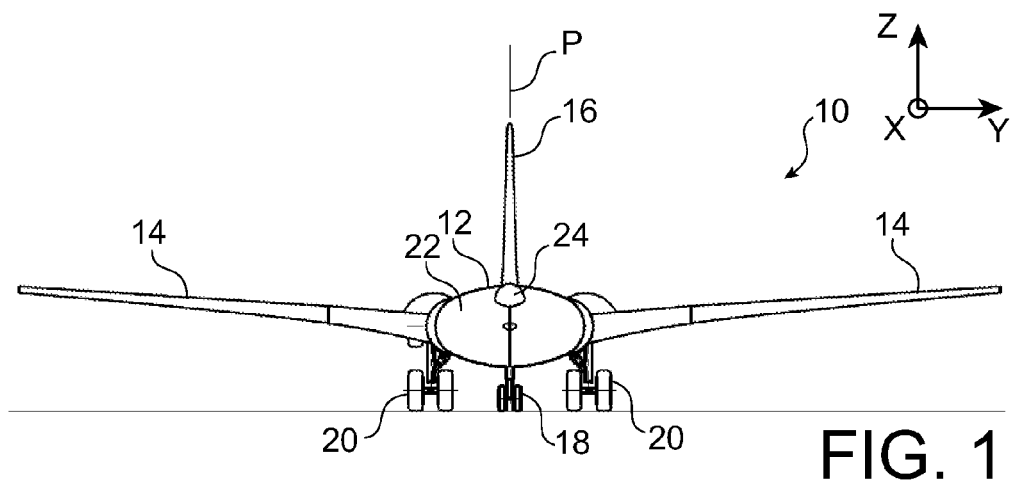
FIG. 1 is a diagrammatical view from the front of a commercial transport aircraft according to a preferred embodiment of the invention.

As shown in FIG. 1, the aircraft 10 comprises a cell generally comprising a fuselage 12, two wings 14, a rear empennage 16, a front landing gear 18 and two rear landing gears 20. The aircraft further comprises engines, which are not shown, and which can be added under the wings or on the rear empennage or on the fuselage, in a manner known per se.

The fuselage 12 has a generally ovalized transversal section according to the transversal direction Y, as shall appear more clearly in what follows.

Figure 2:
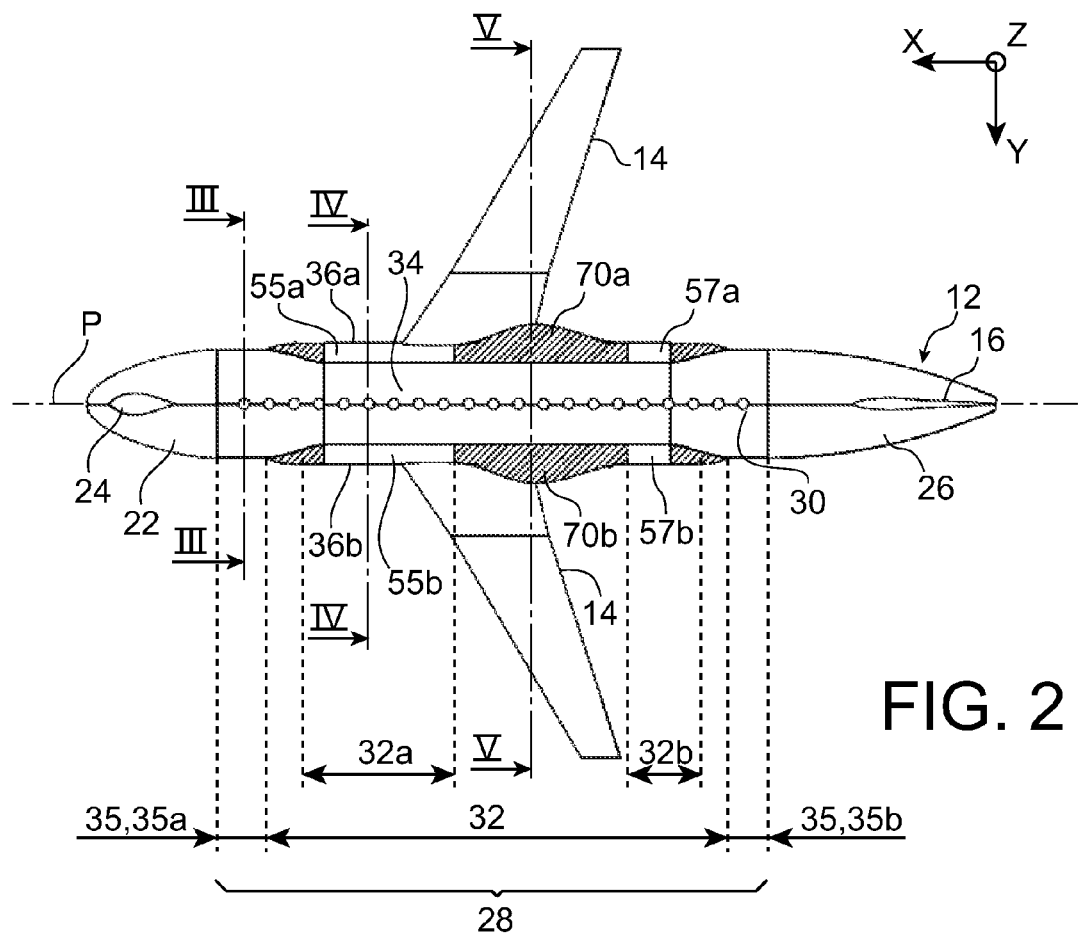
FIG. 2 is a diagrammatical view from the top of the aircraft of FIG. 1.

As can be seen more clearly in FIG. 2, the fuselage 12 integrates a front part 22 delimiting a cockpit provided with a window 24, as well as a rear part 26 to which connects the rear empennage 16.

Between the front part 22 and the rear part 26, the fuselage 12 comprises an intermediate portion 28, which is for example formed of several sections of fuselage assembled end-to-end, and wherein is housed a passenger cabin.

In the example shown, the passenger cabin is provided with a longitudinal row of windows 30 integrated to an upper portion of the fuselage and centered in relation to a median vertical plane P of the aircraft. Alternatively, the windows integrated to the upper portion of the fuselage can be arranged in two longitudinal rows, more preferably mutually symmetrical in relation to plane P, or according to other types of arrangements.

The fuselage 12 comprises, in its intermediate portion 28, a first longitudinal portion 32 and a second longitudinal portion 35.

The second longitudinal portion 35 has a substantially constant transversal section along the longitudinal direction X (FIG. 2).

Figure 3:
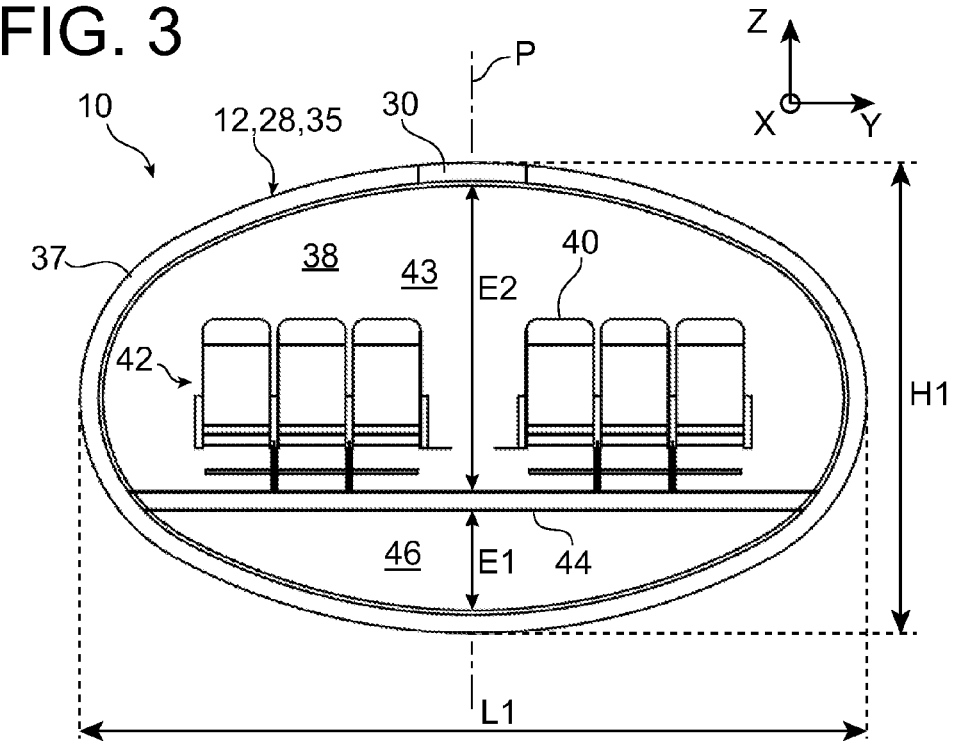
FIG. 3 is a diagrammatical view as a transversal cross-section of the aircraft of FIGS. 1 and 2, according to the plane III-III of FIG. 2.

The transversal section of the second longitudinal portion 35 can be seen in FIG. 3. This transversal section is of oval shape according to the transversal direction Y. Its total width L1 is more preferably greater than 1.3 times its total height H1, and is in the example shown approximately equal to 1.7 times its total height H1.

In the example shown, the second longitudinal portion 35 is split into a front portion 35a and a rear portion 35b.

A portion of the passenger cabin is housed in said second longitudinal portion 35. FIG. 3 as such makes it possible to see the passenger cabin 38, which comprises a plurality of rows of passenger seats 40, with one 42 of these rows able to be seen in this FIG. 3. Each row comprises for example six seats and is for example divided into two symmetrical portions, by a central corridor 43 of the passenger cabin.

The passenger seats 40 are mounted on a passenger cabin floor 44, which divides the intermediate portion 28 of the fuselage into an upper portion corresponding to the passenger cabin 38 and into a lower portion 46.

Due to the ovalized shape of the fuselage 12, the lower portion 46 is of relatively low extent according to the vertical direction Z and is not intended for the storage of luggage and/or of merchandise. This lower portion 46 can comprise support structures of the passenger cabin floor 44, which can be of a known type and which shall not be described here. The lower portion 46 can also house certain onboard service equipment of the aircraft, and/or one or several fuel tanks, which can be of conventional types and shall not be described either.

As shown in FIG. 2, the first longitudinal portion 32 is arranged between the front portion 35a and the rear portion 35b of the second longitudinal portion 35, and has a median portion 34, wherein is housed a portion of said passenger cabin 38, as well as two lateral protuberances 36a, 36b mutually symmetrical in relation to the vertical median plane P, intended to form storage areas, as shall appear more clearly in what follows.

Figure 4:
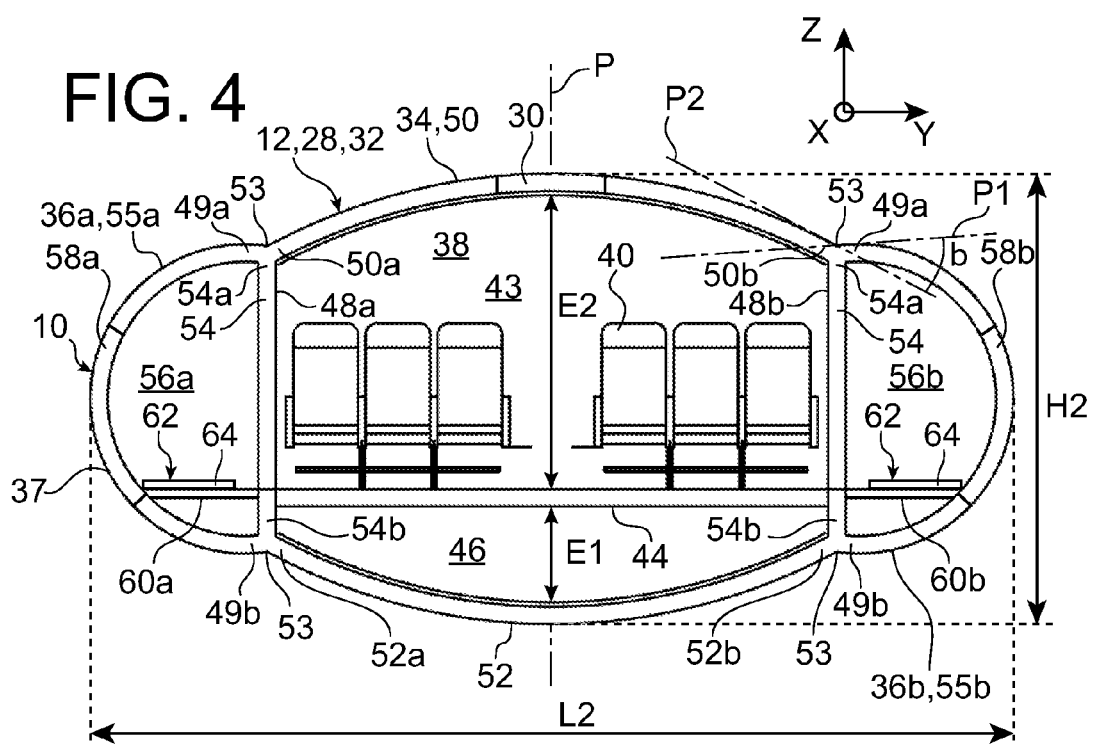
FIG. 4 is a diagrammatical view as a transversal cross-section of the aircraft of FIGS. 1 and 2, according to the plane IV-IV of FIG. 2.

As shown in FIG. 2, the first longitudinal portion 32 comprises two portions 32a and 32b each having a constant transversal section along the longitudinal direction X of the aircraft. This transversal section can be seen in FIG. 4 which is a view according to the plane IV-IV of FIG. 2. FIG. 4 therefore makes it possible to see the median portion 34 and the two lateral protuberances 36a and 36b.

The median portion 34 has a transversal section corresponding to the section of the second longitudinal portion 35 that can be seen in FIG. 3, which has been truncated laterally by two longitudinal partitions 48a, 48b. As such, the median portion 34 has as a transversal section a shape that can substantially be superimposed on the shape of the second longitudinal portion 35.

Due to the presence of the two lateral protuberances 36a and 36b, the first longitudinal portion 32 has a transversal section extending laterally beyond the second longitudinal portion 35, on each side of the median vertical plane P of the aircraft. This is in particular the case as regards the two portions 32a and 32b with constant section belonging to the first longitudinal portion 32.

The section of fuselage of FIG. 4 has a total width L2 which is more preferably greater than 1.5 times its total height H2, and which is in the example shown approximately equal to 2 times its total height H2.

Note that each of the lateral protuberances 36a and 36b form protrusions towards the exterior of the aircraft within an external surface 37 of the fuselage 12.

The two longitudinal partitions each form a separation between the median portion 34 and the corresponding lateral protuberance 36a, 36b. Each of the two longitudinal partitions 48a, 48b as such has upper and lower ends connected to the fuselage 12 (which can be seen on references 54a and 54b in FIG. 4). In the example shown, these longitudinal partitions 48a, 48b extend parallel to the vertical direction Z of the aircraft.

The median portion 34 has an upper wall 50 and a lower wall 52 which are curved and have a relatively large radius of curvature, while the lateral protuberances 36a and 36b are each formed of a curved wall having a relatively small radius of curvature. In the example shown, each lateral protuberance 36a and 36b is for example of semi-circular shape and has for example a radius of curvature approximately five times smaller than the radius of curvature of the aforementioned upper 50 and lower 52 walls. When they are seen as a section according to the plane of FIG. 4, the lateral protuberances 36a, 36b as such take the shape of lobes.

Generally, each of the lateral protuberances 36a and 36b has opposite ends connected respectively to the upper 50 and lower 52 walls of the median portion 34 by forming a discontinuity 53 of the curvature of the fuselage. It must be understood here that the fuselage 12 has an angle on the connection of each of the upper 50 and lower 52 walls of the median portion 34 with the lateral protuberances 36a and 36b, i.e., a longitudinal connection line (designated by the reference 53) whereon a plane P1 tangent to the corresponding lateral protuberance 36a, 36b is not confounded with a plane P2 tangent to the corresponding wall 50, 52 of the median portion 34. In the example shown, these planes P1 and P2 form for example between them an angle β substantially equal to 30 degrees. Generally speaking, this angle is preferably greater than 15 degrees.

Moreover, each of the longitudinal partitions 48a, 48b incorporates a plurality of uprights 54 connecting a connection region of the upper wall 50 of the median portion 34 and of the corresponding lateral protuberance 36a, 36b, to a connection region of the lower wall 52 of the median portion 34 and of said lateral protuberance 36a, 36b. Each of the uprights 54 as such has an upper end 54a connected jointly to the upper end 49a of the corresponding lateral protuberance 36a, 36b and to a corresponding lateral end 50a, 50b of the upper wall 50 of the median portion 34, as well as a lower end 54b connected jointly to the lower end 49b of the corresponding lateral protuberance 36a, 36b and to a corresponding lateral end 52a, 52b of the lower wall 52 of the median portion 34. Two of these uprights 54, which belong respectively to the two longitudinal partitions 48a, 48b, are passed through by the cutting plane of FIG. 4 and can therefore be seen in this figure.

Generally, these uprights 54 participate in the rigidity of the fuselage, and make it possible in particular to take on the loads due to the pressurization that result from the discontinuities in curvature 53 of the fuselage.

As shown in FIG. 3, the passenger cabin floor 44 extends to a height such that, when the intermediate portion 28 is seen as a transversal section, a vertical extent E1 of the lower portion 46, measured in the median vertical plane P of the aircraft, is less than half of a vertical extent E2 of the passenger cabin 38 also measured in the median vertical plane P. In the example shown, the vertical extent E1 of the lower portion 46 is approximately equal to one-third of the vertical extent E2 of the passenger cabin 38.

The lateral protuberances 36a and 36b have two front portions 55a and 55b (FIG. 2) which define respectively two front storage areas 56a and 56b (FIG. 4) mutually symmetrical in relation to plane P. The lateral protuberances 36a and 36b also have two rear portions 57a and 57b (FIG. 2) which define respectively two mutually symmetrical rear storage areas in relation to plane P.

The lateral protuberances 36a and 36b comprise access doors 58a, 58b (FIG. 4) integrated into their respective front portions 55a, 55b, as well as access doors integrated into their respective rear portions 57a, 57b. These access doors allow respectively for an access to the front 56a, 56b and rear storage areas. The design of such access doors relates to known techniques and shall not be described in detail here.

Alternatively or in complementary manner, doors can be provided within the longitudinal partitions 48a and 48b in order to allow for access to the front 56a, 56b and/or rear storage areas.

Note that the arrangement of the windows 30 in the upper wall 50 makes it possible to offer passengers a view of the outside environment of the aircraft despite the presence of the lateral protuberances on the sides of the passenger cabin.

Moreover, each of the storage areas is provided with a storage area floor 60a, 60b extending in the extension of the passenger cabin floor 44, and for example separated from the latter by the corresponding longitudinal partition 48a, 48b. Each storage area floor 60a, 60b is provided with fastening devices 62 intended in particular to receive luggage or merchandise containers, and comprising for example rails 64 provided with fastening hooks. These fastening devices 62 can be of a known type and shall not be described in detail.

Figure 4A:
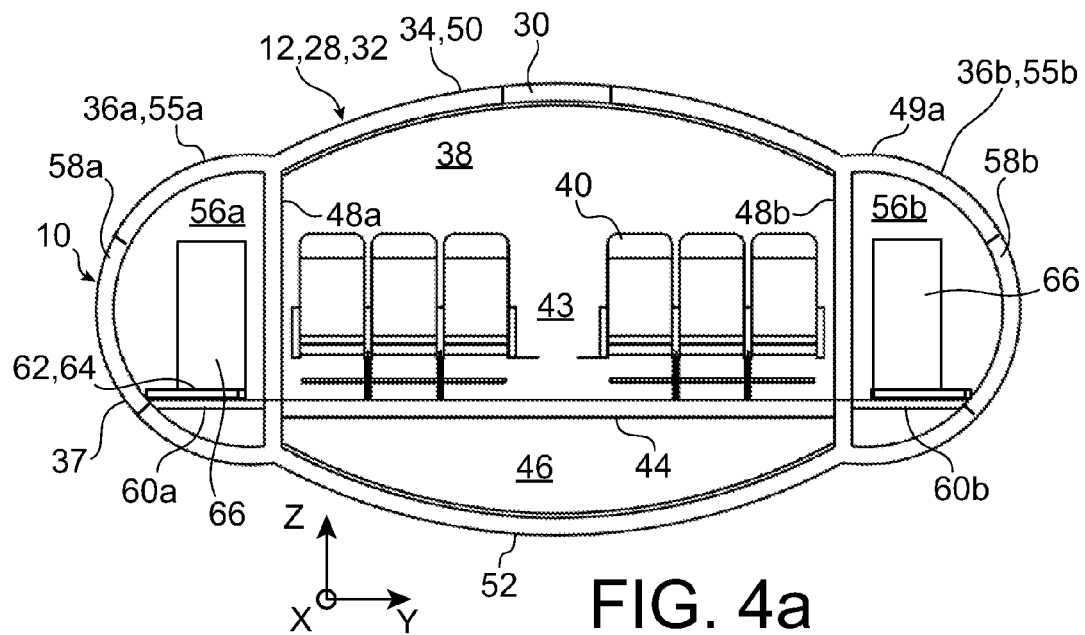
FIGS. 4a and 4b are views similar to FIG. 4, showing the aircraft of FIGS. 1 and 2 provided respectively with electronics bays and removable fuel tanks.

Some at least of these fastening devices 62 are more preferably adapted for the mounting of electronics bays 66 or other onboard service equipment, as shown in FIG. 4a.

Figure 4B:
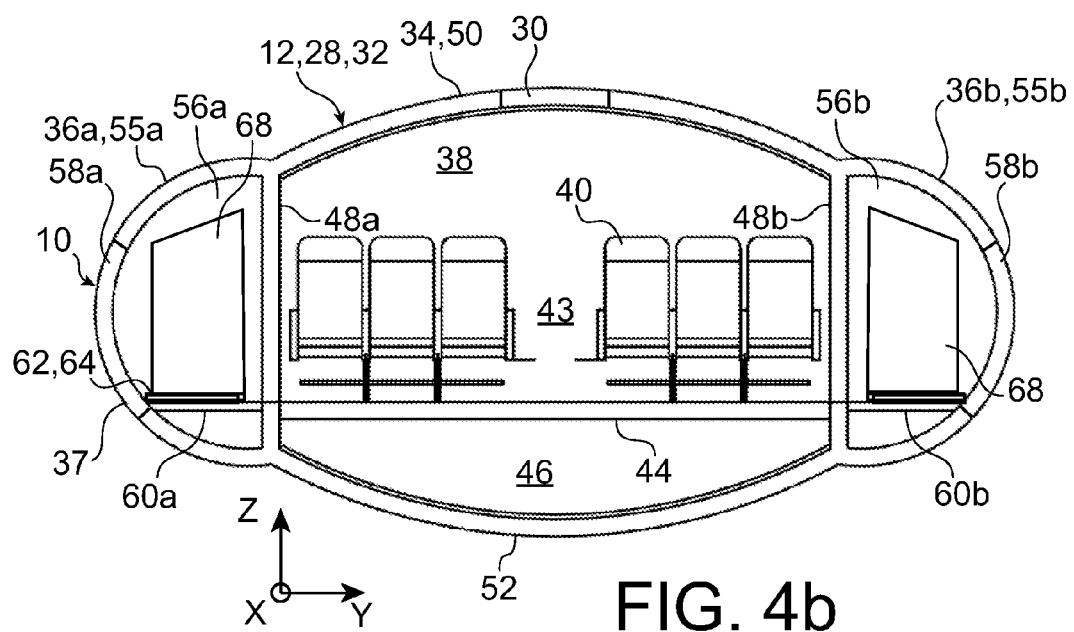

In addition, some at least of these fastening devices 62 are advantageously adapted for the mounting of removable fuel tanks 68, as shown in FIG. 4b.

The destination of the front and rear storage areas can as such be modified according to the needs.

In particular, an increase in the distance that the aircraft can travel can be obtained by coupling removable fuel tanks 68 to certain fastening devices 62 and by connecting these tanks to a main fuel system of the aircraft. The aircraft, provided with fixed fuel tanks housed in the wings 14 and/or in the lower portion 46 of the fuselage, then has a maximum quantity of fuel that is increased beyond the limit imposed by the volume of the fixed tanks.

Inversely, a lightening of the aircraft and/or an increase in the carrying capacity of luggage and/or of merchandise can be obtained by removing such removable fuel tanks 68 when their presence onboard is not necessary, in order to increase the volume available for luggage and/or merchandise.

Figure 5:
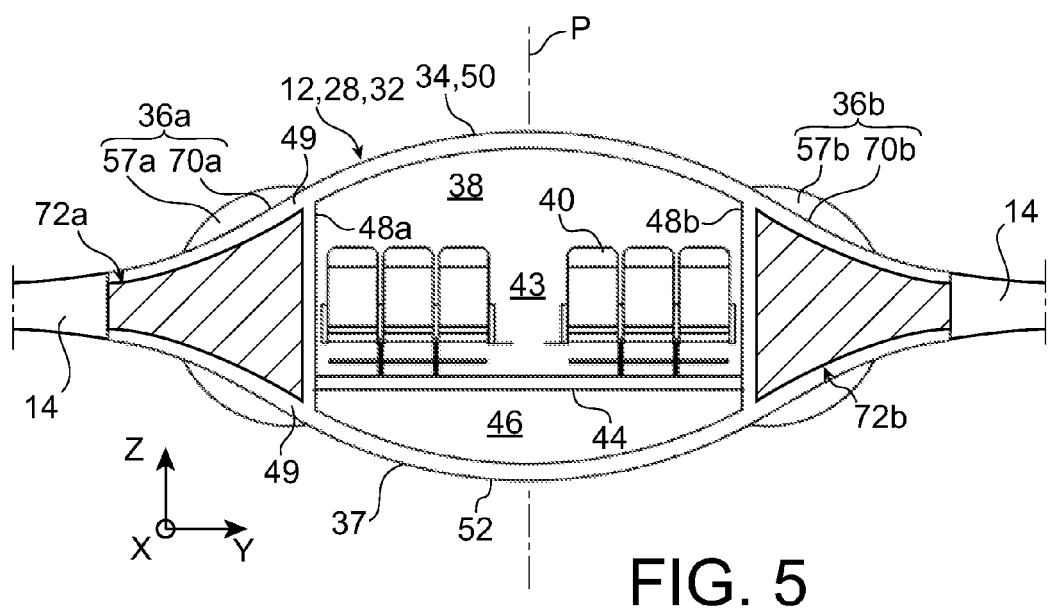
FIG. 5 is a diagrammatical view as a transversal cross-section of the aircraft of FIGS. 1 and 2, according to the plane V-V of FIG. 2.

Moreover, between its front portion 55a, 55b and its rear portion 57a, 57b, each lateral protuberance 36a, 36b comprises an intermediate portion 70a, 70b (FIG. 2) intended for the housing of a wing spar box 72a, 72b connecting the median portion 34 of the longitudinal portion 32 of the fuselage to the corresponding wing 14, as shown in FIG. 5.

In this intermediate portion 70a, 70b, the lateral protuberance 36a, 36b has a refined profile according to the vertical direction Z, in such a way as to follow the outside contour of the wing spar box 72a, 72b. Each lateral protuberance 36a, 36b is shaped in such a way as to provide a progressive transition between each intermediate portion 70a, 70b and each of the corresponding front 55a, 55b and rear 57a, 57b portions, in order to guarantee optimum aerodynamic performance of the aircraft.

Note that the wing spar boxes 72a, 72b, which are designed to connect each of the wings 14 to the upper 50 and lower 52 walls of the median portion 34, are shown very diagrammatically in FIG. 5, and can have varied structures, of which the detailed design is not the object of this invention. Generally, these wing spar boxes 72a, 72b are advantageously designed to connect each of the wings 14 to circumferential frames integrated to the upper 50 and lower 52 walls respectively.

Note that the wing spar boxes 72a, 72b extend entirely laterally in relation to the median portion 34. The aircraft is as such devoid of a central spar box passing through the median portion 34.

The respective intermediate portions 70a, 70b of the lateral protuberances 36a and 36b can furthermore each integrate a landing gear compartment (cannot be seen in the figures) intended to house a corresponding rear landing gear 20.

In the example shown, the wings are with median installation in such a way that their connection takes place on lateral protuberances 36a, 36b.

Alternatively, the wings can be with top or bottom installation, in such a way that their connection takes place outside of the lateral protuberances 36a, 36b.

The lateral protuberances 36a, 36b further comprise front 74a, 74b and rear 76a, 76b end portions that are profiled to allow for a progressive transition of each lateral protuberance with the front and rear ends of the fuselage 12 respectively.

The front end portions 74a, 74b can be used to house possible additional wing surfaces such as canard wings (not shown in the figures).

Generally, the lateral protuberances therefore offer storage areas allowing for optimum use of the interior volume of the fuselage of the aircraft, and as such allowing for a reduction in the total volume of the fuselage and in particular of the transversal section of this fuselage, thus allowing for an improvement in the general performance of the aircraft.

The invention further makes it possible to facilitate the adaptation of the aircraft to the needs of customers, firstly during the manufacture of the aircraft, thanks to the possibility of using interchangeable sections provided with lateral protuberances of different dimensions, then during the commercial operation of the aircraft, due to the possibility of modifying the type of load taken in the storage areas defined by the lateral protuberances.

The connection of the wings to the sides of the fuselage furthermore makes it possible to improve the resistance of the fuselage to pressurization loads.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:
1. An airplane for the commercial transport of passengers, comprising:
   a fuselage comprising:
      a front part;
      a rear part; and
      an intermediate portion connecting the front part to the rear part and wherein is housed a passenger cabin provided with a plurality of passenger seats,
      wherein said intermediate portion of the fuselage comprises a first longitudinal portion, comprising:
         a median portion centered in relation to a median vertical plane of the airplane and wherein is housed at least one portion of said passenger cabin, and
         at least two lateral protuberances arranged on either side of said median portion, said lateral protuberances being separated from said passenger cabin respectively by means of two longitudinal partitions laterally delimiting said passenger cabin, said lateral protuberances defining respectively at least two storage areas on either side of said median vertical plane, and said lateral protuberances having an upper end and a lower end which connect to said median portion of said first longitudinal portion of the fuselage, wherein the connection of said upper end and lower end of each of said lateral protuberances forms an upper discontinuity and a lower discontinuity of the curvature of an external surface of the fuselage as viewed in transverse section wherein the upper discontinuity is positioned above a passenger cabin floor which divides the intermediate portion of the fuselage into an upper portion corresponding to the passenger cabin and into a lower portion, and the lower discontinuity is positioned below the passenger cabin floor, wherein said intermediate portion of the fuselage further comprises a second longitudinal portion, wherein is housed a portion of said passenger cabin, and having a constant transversal section along a longitudinal direction of the airplane, and at least one portion of said first longitudinal portion having a constant transversal section along the longitudinal direction of the airplane extending laterally beyond said second longitudinal portion on each side of said median vertical plane.

2. The airplane according to claim 1, wherein each of said longitudinal partitions has upper and lower ends connected to said fuselage.

3. The airplane according to claim 1, wherein said median portion of said first longitudinal portion of the fuselage has as a transversal section a shape that can be substantially superimposed on the shape of said second longitudinal portion as a transversal section.

4. The airplane according to claim 1, wherein the passenger cabin floor extends to a height such that, when said intermediate portion is seen as a transversal section, a vertical extent of said lower portion, measured in said median vertical plane of the airplane, is less than half of a vertical extent of said passenger cabin also measured in said median vertical plane.

5. The airplane according to claim 4, wherein at least one portion of each of said storage areas is delimited at the bottom by a storage area floor extending in the extension of said passenger cabin floor.

6. The airplane according to claim 5, wherein each storage area floor is separated from the passenger cabin floor by the corresponding longitudinal partition.

7. The airplane according to claim 1, comprising devices for storing at least one of luggage and merchandise integrated to at least one of said storage areas.

8. The airplane according to claim 1, comprising at least one onboard service equipment housed in at least one of said storage areas.

9. The airplane according to claim 1, comprising two fuel tanks housed respectively in said storage areas.

10. The airplane according to claim 1, comprising two landing gear compartments housed respectively in said lateral protuberances.

11. The airplane according to claim 1, further comprising two wings as well as two wing spar boxes connecting respectively each of said wings to said median portion of said first longitudinal portion of the fuselage and extending entirely laterally in relation to this median portion.

12. The airplane according to claim 1, wherein said first longitudinal portion of the fuselage is provided with a plurality of windows integrated to an upper wall of said median portion of said first longitudinal portion of the fuselage.

13. The airplane according to claim 1, wherein said lateral protuberances are arranged symmetrically in relation to said median vertical plane of the airplane.

14. An airplane for the commercial transport of passengers, comprising:
 a fuselage comprising:
  a front part;
  a rear part; and
  an intermediate portion connecting the front part to the rear part and wherein is housed a passenger cabin provided with a plurality of passenger seats,
  wherein said intermediate portion of the fuselage comprises a first longitudinal portion, comprising:
   a median portion centered in relation to a median vertical plane of the airplane and wherein is housed at least one portion of said passenger cabin, and
   at least two lateral protuberances arranged on either side of said median portion,
   said lateral protuberances being separated from said passenger cabin respectively by means of two longitudinal partitions laterally delimiting said passenger cabin,
   said lateral protuberances defining respectively at least two storage areas on either side of said median vertical plane,
   and said lateral protuberances having an upper end and a lower end which connect to said median portion of said first longitudinal portion of the fuselage,
   wherein the connection of said upper end and lower end of each of said lateral protuberances forms a discontinuity of the curvature of an external surface of the fuselage as viewed in transverse section,
  wherein said intermediate portion of the fuselage further comprises a second longitudinal portion, wherein is housed a portion of said passenger cabin, and having a constant transversal section along a longitudinal direction of the airplane, and at least one portion of said first longitudinal portion having a constant transversal section along the longitudinal direction of the airplane extending laterally beyond said second longitudinal portion on each side of said median vertical plane, and
  wherein each of said longitudinal partitions integrates vertical uprights each having:
   an upper end connected jointly to the upper end of the corresponding lateral protuberance and to an upper lateral end of said median portion of said first longitudinal portion of the fuselage, and
   a lower end connected jointly to the lower end of the corresponding lateral protuberance and to a lower lateral end of said median portion of said first longitudinal portion of the fuselage.

15. The airplane according to claim 14, wherein the discontinuity includes an upper discontinuity and a lower discontinuity of the curvature of an external surface of the fuselage as viewed in transverse section wherein the upper discontinuity is positioned above a passenger cabin floor which divides the intermediate portion of the fuselage into an upper portion corresponding to the passenger cabin and into a lower portion, and the lower discontinuity is positioned below the passenger cabin floor.

16. The airplane according to claim 15, wherein each lateral protuberance is provided with a door within the longitudinal partitions to allow for access to each lateral protuberance.

17. An airplane for the commercial transport of passengers, comprising:
  a fuselage comprising:
    a front part;
    a rear part; and
    an intermediate portion connecting the front part to the rear part and wherein is housed a passenger cabin provided with a plurality of passenger seats,
    wherein said intermediate portion of the fuselage comprises a first longitudinal portion, comprising:
      a median portion centered in relation to a median vertical plane of the airplane and wherein is housed at least one portion of said passenger cabin, and
      at least two lateral protuberances arranged on either side of said median portion,
      said lateral protuberances being separated from said passenger cabin respectively by means of two longitudinal partitions laterally delimiting said passenger cabin,
      said lateral protuberances defining respectively at least two storage areas on either side of said median vertical plane,
      and said lateral protuberances having an upper end and a lower end which connect to said median portion of said first longitudinal portion of the fuselage,
    wherein the connection of said upper end and lower end of each of said lateral protuberances forms an upper discontinuity and a lower discontinuity of the curvature of an external surface of the fuselage as viewed in transverse section wherein the upper discontinuity is positioned above a passenger cabin floor which divides the intermediate portion of the fuselage into an upper portion corresponding to the passenger cabin and into a lower portion, and the lower discontinuity is positioned below the passenger cabin floor.

18. The airplane according to claim 17, wherein each lateral protuberance is provided with a door within a longitudinal partition separating each protuberance from the passenger cabin to allow for access to each lateral protuberance.

19. The airplane according to claim 17, wherein each of said lateral protuberances comprises an access door integrated into a front portion of the lateral protuberance, and each of said lateral protuberances comprises an access door integrated into a rear portion of the lateral protuberance.

20. The airplane according to claim 17, wherein the airplane is devoid of a cargo hold under the passenger cabin floor.

\* \* \* \* \*